United States Patent
Crisp et al.

(10) Patent No.: US 11,351,977 B2
(45) Date of Patent: Jun. 7, 2022

(54) HYBRID VEHICLE FRONT END ACCESSORY DRIVE CONTROL SYSTEM AND METHOD

(71) Applicant: FORD GLOBAL TECHNOLOGIES, LLC, Dearborn, MI (US)

(72) Inventors: Nicholas Dashwood Crisp, Hadleigh (GB); Ian Robinson, Chelmsford (GB); David Perkins, Chelmsford (GB); Wassim Koubaa, London (GB); Nicole Barrett, Billericay (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 470 days.

(21) Appl. No.: 16/217,818

(22) Filed: Dec. 12, 2018

(65) Prior Publication Data

US 2019/0184966 A1    Jun. 20, 2019

(30) Foreign Application Priority Data

Dec. 15, 2017  (GB) ...................................... 1721050
Dec. 15, 2017  (GB) ...................................... 1721052

(51) Int. Cl.
*B60W 20/00*    (2016.01)
*B60H 1/00*    (2006.01)
(Continued)

(52) U.S. Cl.
CPC ........... *B60W 20/00* (2013.01); *B60H 1/0045* (2013.01); *B60K 6/26* (2013.01); *B60L 1/003* (2013.01);
(Continued)

(58) Field of Classification Search
None
See application file for complete search history.

(56) References Cited

U.S. PATENT DOCUMENTS 6,318,486 B2 *  11/2001  Masaki .................. B60K 6/387
                                                          477/6
10,124,797 B2 *  11/2018  Kim ....................... B60W 10/08
(Continued)

FOREIGN PATENT DOCUMENTS

JP         2015147454 A      8/2015

OTHER PUBLICATIONS

DE Examination Report GB 1 721 052.7 filed May 24, 2018. 8 pages.
(Continued)

*Primary Examiner* — Aniss Chad
*Assistant Examiner* — Mahmoud M Kazimi
(74) *Attorney, Agent, or Firm* — Brooks Kushman PC; David Kelley

(57) ABSTRACT

A method of operating an accessory drive system for a motor vehicle, wherein the accessory drive system includes one or more accessory components, a motor generator of the motor vehicle, and a flexible drive element configured to transmit a torque load between the one or more accessory components and the motor generator, includes determining a maximum permissible flexible drive element torque threshold, detecting an increase in torque demand on the flexible drive element, determining when the torque demand on the flexible drive element will exceed the flexible drive element torque threshold, and reducing the torque demand of one or more of the accessory components so that the flexible drive element torque threshold is not exceeded.

12 Claims, 4 Drawing Sheets

(51) Int. Cl.
*B60K 6/26* (2007.10)
*B60L 1/00* (2006.01)
*F16D 48/00* (2006.01)
*F16H 7/08* (2006.01)

(52) U.S. Cl.
CPC .............. *F16D 48/00* (2013.01); *F16H 7/08* (2013.01); *B60K 2006/268* (2013.01); *B60W 2510/18* (2013.01); *B60W 2510/30* (2013.01); *B60W 2710/083* (2013.01); *B60W 2710/30* (2013.01); *B60Y 2200/92* (2013.01); *B60Y 2300/18125* (2013.01); *F16H 2007/0887* (2013.01)

(56) References Cited

U.S. PATENT DOCUMENTS

| | | | |
|---|---|---|---|
| 11,052,743 B2 * | 7/2021 | Okubo | B60K 6/22 |
| 2003/0083803 A1 * | 5/2003 | Serkh | F02B 67/06 |
| | | | 701/115 |
| 2003/0155772 A1 * | 8/2003 | Scherrbacher | F02N 15/025 |
| | | | 290/40 B |
| 2015/0008889 A1 * | 1/2015 | Hayashi | H02P 9/14 |
| | | | 322/24 |
| 2019/0184966 A1 * | 6/2019 | Crisp | B60K 6/26 |

OTHER PUBLICATIONS

DE Examination Report GB 1 721 050.1 filed Oct. 12, 2018. 7 pages.

* cited by examiner

HYBRID VEHICLE FRONT END ACCESSORY DRIVE CONTROL SYSTEM AND METHOD

CROSS-REFERENCE TO RELATED APPLICATIONS

This application claims foreign priority benefits under 35 U.S.C. § 119(a)-(d) to GB Application 1721050.1 filed Dec. 15, 2017, and GB Application 1721052.7 filed Dec. 15, 2017, which are hereby incorporated by reference in their entirety.

TECHNICAL FIELD

The claimed subject matter relates to an accessory drive system for a hybrid motor vehicle.

BACKGROUND

Conventional hybrid vehicles use a combination of an internal combustion engine and an electric motor. The electric motor may also act as a generator and provide regenerative braking, so that the kinetic energy of the vehicle is recovered as the vehicle slows down. In some hybrid configurations, the electric motor may be arranged in a front end accessory drive (FEAD) and connected to an internal combustion engine through a drive belt. This arrangement is known as a Belt Integrated Started Generator (B-ISG) system. In such a system, the electric motor provides both torque assist and regenerative energy recuperation through the FEAD. For optimum hybrid performance, the B-ISG must operate at maximum charging potential to recuperate or harvest as much kinetic energy as possible during a recuperation event. By providing torque assist to a crank shaft of the engine, the B-ISG is able to offset or supplement engine torque.

FEAD system designs are constrained by the maximum torque that can be transmitted through the drive belt. The maximum drive belt torque is the limit of torque that can be transmitted through the drive belt before the drive belt experiences parasitic losses (such as drive belt slip), and torque transmission is reduced. This limitation reduces the potential benefit of a hybrid system by, for example, preventing optimum performance during regenerative recuperation. This limitation may reduce the efficiency of belt-driven components, and may reduce overall hybrid performance during routine use. Therefore, it is desirable to reduce parasitic losses of a FEAD to protect the drive belt from damage, prolong the service life of the drive belt, and prevent the loss of torque transmission through the drive belt.

With reference to FIG. 1, a passive front end accessory drive system 100 includes a generator pulley 102, a drive pulley 104, an accessory component pulley 106, such as an air conditioner compressor pulley, a first idler pulley 108, a second idler pulley 110, an idler pulley connector 120 and a drive belt 112 comprising a first drive belt portion 114, a second drive belt portion 116, and a third drive belt portion 118. The arrows of each pulley in FIG. 1 illustrate the direction of rotation of each pulley.

In the passive front end accessory drive system 100, as shown in FIG. 1, the generator pulley 102, the drive pulley 104, and the air conditioner compressor pulley 106 are arranged in a triangle with the drive belt 112 wrapped around the outside circumference of each pulley, thereby connecting the pulleys and separating the drive belt 112 into three portions. The first drive belt portion 114 connects the drive pulley 104 and the air conditioner compressor pulley 106, the second drive belt portion 116 connects the air conditioner compressor pulley 106 and the generator pulley 102, and the third drive belt portion connects the drive pulley 104 and the generator pulley 102.

The idler pulley connector 120 is mounted substantially centrally with respect to the drive pulley 104, the generator pulley 102 and the air conditioner compressor pulley 106. The first idler pulley 108 and the second idler puller 110 are connected to the idler pulley connector 120, and are biased towards one another by a biasing element such as a tension spring (not shown), associated with the idler pulley connector 120.

The first idler pulley 108 is arranged between the generator pulley 102 and the air conditioner compressor pulley 106 and is biased by the idler pulley biasing element towards the second idler pulley 110, thereby deflecting the second drive belt portion 116 towards the second idler pulley and tightening the drive belt 112. The second idler pulley 110 is arranged between the generator pulley 102 and the drive pulley 104 and deflects the third drive belt portion 118 towards the first idler pulley under the action of the biasing element of the central idler pulley connector 120.

The first idler pulley 108 and the second idler pulley 110 serve to increase friction between the drive belt 112 and the pulleys and thereby minimize belt slip. The idler pulleys increase friction by increasing tension in the drive belt and increasing the wrap angle of the drive belt 112 with respect to the generator pulley 102, the drive pulley 104 and the air conditioner compressor pulley 106. Drive belt tension is increased by virtue of the idler pulleys pulling the second drive belt portion 116 and the third drive belt portion 118 towards one another. As a consequence of the idler pulleys pulling the second drive belt portion 116 and the third drive belt portion 118 towards one another under the action of the biasing element, an increased portion of the drive belt comes into contact with the circumference of the pulleys and the wrap angle is thereby increased.

When one pulley, for example the drive pulley 104, is driven to rotate, a rotational force is generated on the rotating pulley. This force is transmitted to the drive belt 112 as a torque load, and the drive belt 112 in turn transmits torque between each of the pulleys. The idler pulleys provide a passive means for increasing the maximum torque load that can be transmitted through the drive belt 112 by increasing the friction between the drive belt 112 and the pulleys through increased drive belt tension and increased pulley wrap angle.

With reference to FIG. 2, an active front end accessory drive system 122 differs from the passive front end accessory drive (FEAD) system 100 of FIG. 1 in that the idler pulley connector 120 is replaced by a first idler pulley connector 124 connected to a first idler pulley 128 and a second idler pulley connector 126 connected to a second idler pulley 130.

The first idler pulley connector 124 may be provided with a first actuator, such as an electric, hydraulic, or pneumatic drive unit which is operable to pivot the first idler pulley 128 by a variable amount into the path of the second drive belt portion 116, and the second idler pulley connector 126 may be provided with a second actuator, such as an electric, hydraulic, or pneumatic drive unit which is operable to pivot the second idler pulley 130 by a variable amount into the path of the third drive belt portion 118. In an alternative arrangement, only one of the first and second idler pulleys may be moved by an actuator to tension the drive belt. By pivoting the idler pulleys towards the drive belt 112 or away from the drive belt 112 by a variable amount, the idler pulley connectors of the active front end accessory drive system 122 provide a means for varying drive belt tension and pulley wrap angle of the drive belt 112. The active front end accessory drive system 122 therefore provides a means for adjusting the tension in the drive belt 112 to suit instantaneous usage requirements of the motor vehicle and minimize belt slip.

With reference to Table 1 below, typical torque limitations of the passive front end accessory drive system 100 and the active front end accessory drive system 122 are provided. Table 1 illustrates that a typical passive front end accessory drive system 100 would lose 2 kW to 6 kW of regenerative charging opportunity based on the limits of the passive front end accessory drive system 100, for example drive belt slip or drive belt damage.

pulley 148 and the generator pulley 150) in response to changing engine speeds may further limit maximum torque. These problems are magnified where the generator is replaced by a motor generator in a B-ISG, because of the requirement in a hybrid system to transfer steady-state torque between the B-ISG and engine for torque assist or regenerative recuperation.

In the torque-loaded front end accessory drive system 144 of FIG. 4, the drive belt wrap around the drive pulley 152 is insufficient to provide the torque required to overcome the drag of the accessory component pulley 148 and the generator pulley 150 when both are operating at maximum effort.

SUMMARY

According to one or more embodiments of the present disclosure, improved availability of hybrid functionality

TABLE 1

Typical Torque Limitations of Active and Passive FEADs

| Operation condition | Engine speed (RPM) | ISG speed (RPM) | Worst case Active system torque limit (Nm at the B-ISG) | Power (kW) | Worst case Passive system torque limit (Nm at the B-ISG) | Power (kW) |
|---|---|---|---|---|---|---|
| Lugging + Boost | 700 | 1715 | 60% limit (25 Nm) | 4.5 | 40% limit (17 Nm) | 3 |
| Idle + Regeneration | 940 | 2240 | 80% limit (34 Nm) | 8 | 60% limit (25 Nm) | 5.9 |
| Idle + Boost | 940 | 2240 | 100% (42 Nm) | 9.9 | 60% limit (25 Nm) | 5.9 |
| Drive + Regeneration | 1000 | 2450 | 80% limit (34 Nm) | 8.7 | 60% limit (25 Nm) | 6.4 |
|  | 1500 | 3675 | 100% (42 Nm) | 16 | 60% limit (25 Nm) | 9.6 |
|  | 2000 | 4900 | 100% (42 Nm) | 22 | 100% (42 Nm) | 22 |
| Drive + Boost | 1000 | 2450 | 100% (42 Nm) | 11 | 100% (42 Nm) | 11 |
|  | 1500 | 3675 | 100% (42 Nm) | 16 | 100% (42 Nm) | 16 |
|  | 2000 | 4900 | 100% (42 Nm) | 22 | 100% (42 Nm) | 22 |

As can be seen from Table 1, the active front end accessory drive system 122 has a higher torque limit than the passive front end accessory drive system 100. However, the introduction of active control adds cost and control complexity to the system.

A plot 132 of optimal machine residency 134 during a New European Drive Cycle (NEDC) is provided in FIG. 3. The plot 132 includes optimal machine residency 134, passive front end accessory drive system limit 136, potential regenerative charging opportunity 138, motor torque limit 140 and generator torque limit 142.

The potential regenerative charging opportunity 138 illustrates the portion of crossover between the generator torque limit 142 and optimal machine residency 134 that is below the passive front end accessory drive system limit 136. Therefore, the potential regenerative charging opportunity 138 indicates that a considerable regenerative charging opportunity is lost in the present passive front end accessory drive system 100.

FIG. 4 illustrates a torque loaded front end accessory drive system 144 in which the drive belt 112 is driving an accessory component pulley 148, and a generator pulley 150 from a drive pulley 152. The resistance from the driven pulleys 148, 150 causes instantaneous belt deflection and stretch as indicated by line 146 in FIG. 4.

The maximum torque limitation of the torque loaded front end accessory drive system 144 is constrained by the extent of drive belt slip or drive belt stretch, and the need to operate one or more accessory components (such as an air conditioning compressor, a power steering pump and a water pump, all of which might typically be contained on the same front end accessory drive loop). The need to accelerate or decelerate the pulleys (particularly the accessory component through a passive front end accessory drive system is provided without introducing losses associated with excessive belt tension, and without needing the complexity and cost of an active front end accessory drive system 122. Various embodiments utilize existing controllable elements of a passive front end accessory drive system to maximize the hybrid functionality.

According to a first aspect of the disclosure, there is provided a method of operating an accessory drive system for a motor vehicle, wherein the accessory drive system comprises: one or more accessory components, a motor generator of the motor vehicle, and a flexible drive element configured to transmit a torque load between the one or more accessory components and the motor generator. The method of operation comprises determining a maximum permissible flexible drive element torque threshold, detecting an increase in torque demand on the flexible drive element, determining when the torque demand on the flexible drive element will exceed the flexible drive element torque threshold, and reducing the torque demand of one or more of the accessory components so that the flexible drive element torque threshold is not exceeded. The flexible drive element may for example comprise a chain, a toothed belt, or a V-belt. In the arrangement described below, the flexible drive element comprises a drive belt.

The step of determining when the torque demand on the drive belt will exceed the drive belt torque threshold may comprise comparing the most recently calculated maximum torque load on the drive belt and the rate of change of maximum torque load and predicting, by the use of at least one of an algorithm and a look up table, when the drive belt torque threshold is being approached.

The increase in torque demand on the belt may be caused by a recuperation event, in which the motor generator operates as a generator and converts the kinetic energy of the vehicle into electrical energy, and thereby decelerates the vehicle. This may also be referred to as a regenerative braking event.

The method may further comprise reducing the torque demand of one or more of the accessory components for a time period of the recuperation event.

The method may further comprise reconfiguring the front-end-accessory-drive-system as soon as the recuperation event is over. The maximum torque demand is thereby maintained below the drive belt load threshold, even during a recuperation event, but the accessory components can still operate at full efficiency for the maximum possible time.

If the accessory component having its torque demand reduced during a recuperation event is an air conditioner compressor, the vehicle air conditioning capacity will be temporarily reduced, but as recuperation events are generally short in duration and full torque to the compressor will be restored as soon as the recuperation event is over, occupants of the vehicle are unlikely to perceive a significant alteration in cabin temperature.

The method may further comprise reducing the torque load to less than the drive belt torque threshold by reducing the torque at one or more accessory pulleys. For example, where a clutch is fitted between the accessory component and the accessory pulley, the clutch may be disconnected. If the reduction in torque at the one or more accessory pulleys is proportional to the increase in torque at the generator pulley the maximum torque load on the belt will stay constant. Thus, at a constant drive shaft torque, as the motor generator torque demand increases the accessory drive system torque demand can be controlled to decrease proportionally.

The step of reducing the torque demand of one or more of the accessory components may comprise at least partially reducing the load on the accessory component. For example, where the accessory component is an air conditioner compressor, the air conditioner output may be reduced, or the air conditioner may be switched off entirely.

The method may further comprise increasing the drive belt torque threshold by increasing the drive belt tension. The drive belt tension may be adjusted by adjusting the position of an accessory pulley or accessory component relative to the engine (e.g. by pivoting the accessory component or accessory pulley away from the engine to thereby tighten the drive belt).

The method may further comprise increasing the drive belt torque threshold by increasing a wrap angle of one or more accessory pulleys and/or the drive pulley. The wrap angle of an accessory pulley may be increased by adjusting the position of an idler pulley which engages the belt.

The method may further comprise adjusting the drive belt torque threshold dependent on the measured belt slip.

The method may further comprise adjusting the drive belt torque threshold dependent on the age of the drive belt.

The method may further comprise adjusting the drive belt torque threshold dependent on the condition of the drive belt.

The step of determining a condition of the drive belt may comprise determining the age of the drive belt, and inferring a condition of the drive belt based on its age. As the belt ages the maximum permissible drive belt torque threshold is generally decreased, but in some circumstances the maximum permissible drive belt torque threshold may be increased incrementally for a predetermined period as the belt "runs in" from its new condition and its friction properties increase, and then will gradually be decreased as the drive belt deteriorates with age. In other applications, the maximum permissible drive belt torque threshold may be decreased gradually or stepwise from the outset or from a predetermined age to account for likely drive belt deterioration.

The method may further comprise the steps of: measuring one or more drive belt parameters, determining the condition of the drive belt, based on the measured value of the one or more belt parameters, and adjusting the drive belt torque threshold dependent on the determined condition of the belt. Consequently, the maximum permissible drive belt torque threshold may be decreased as the drive belt deteriorates in service.

The method may comprise using at least one of an algorithm and a look up table which associates a given measured drive belt parameter with a corresponding condition of the drive belt or a corresponding drive belt maximum torque threshold.

The one or more drive belt parameters may comprise at least one of drive belt slip, drive belt stretch, drive belt friction characteristics, drive belt cracking, drive belt pilling, drive belt wear, drive belt abrasion and drive belt rib separation.

To avoid unnecessary duplication of effort and repetition of text in the specification, certain features are described in relation to only one or several aspects or arrangements of the representative embodiments. However, it is to be understood that, where it is technically possible, features described in relation to any aspect or arrangement may also be used or combined with any other aspect or arrangement described herein.

DETAILED DESCRIPTION

Figure 1:
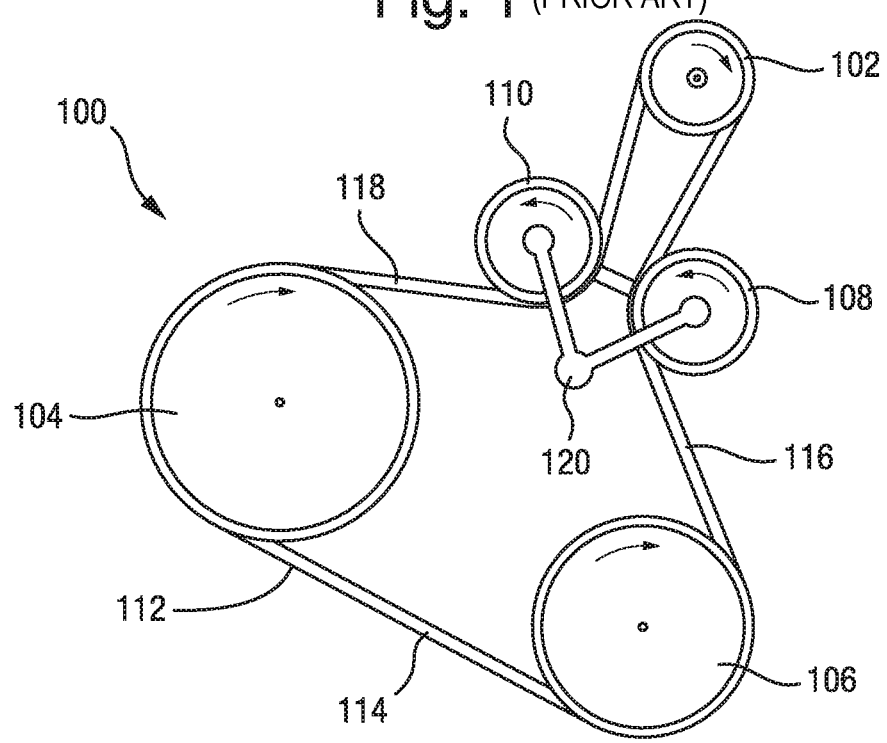
FIG. 1 is a schematic view of a prior art passive front end accessory drive system.
Figure 2:
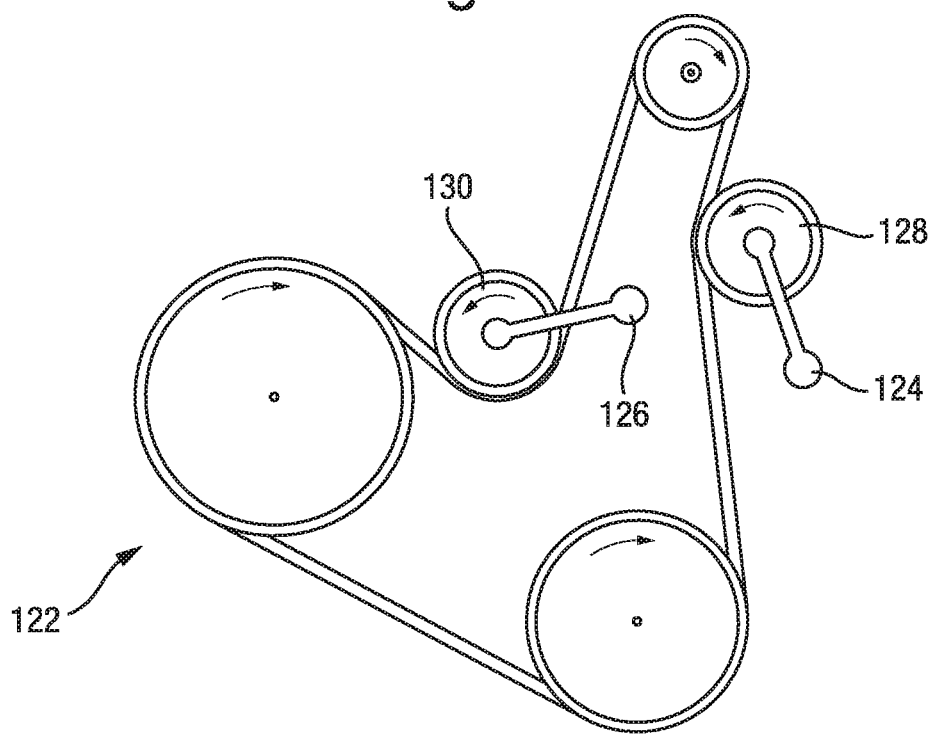
FIG. 2 is a schematic view of a prior art active front end accessory drive system.
Figure 3:
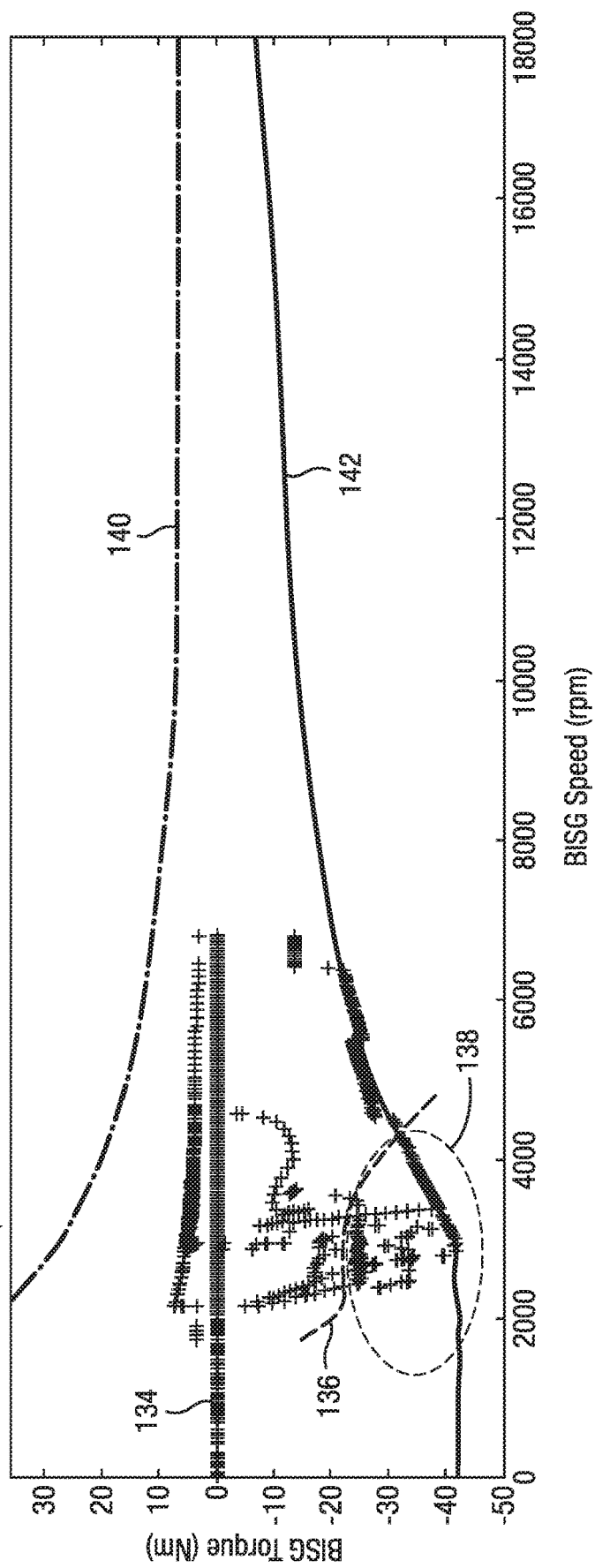
FIG. 3 is a plot of optimal machine residency during a New European Drive Cycle (NEDC)
Figure 4:
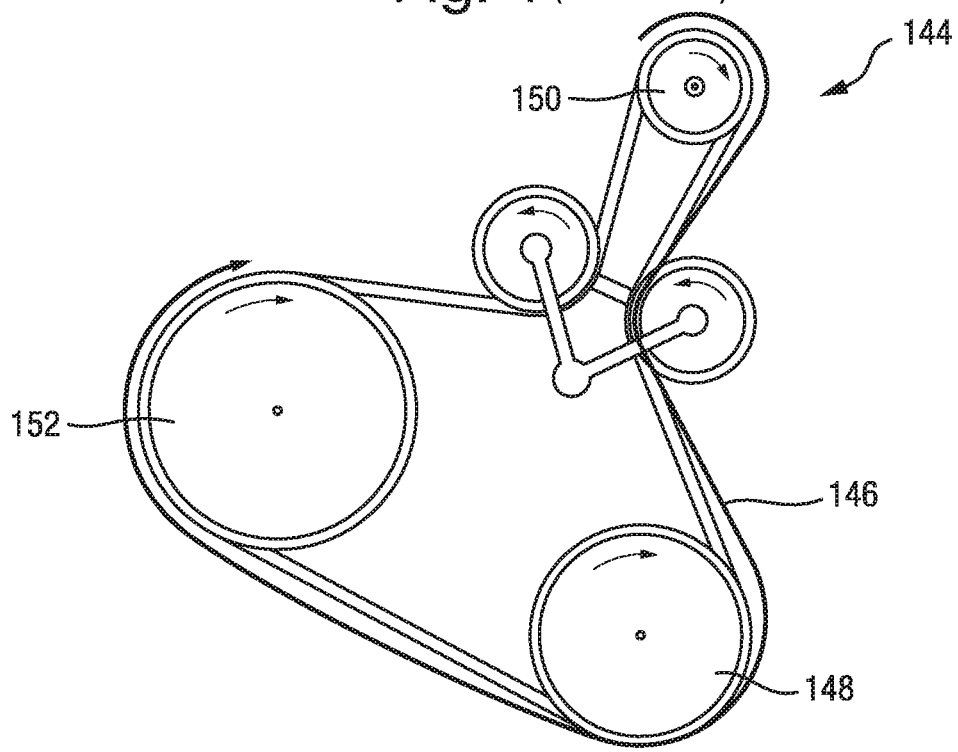
FIG. 4 is a schematic view of a prior art torque loaded front end accessory drive system.
Figure 5:
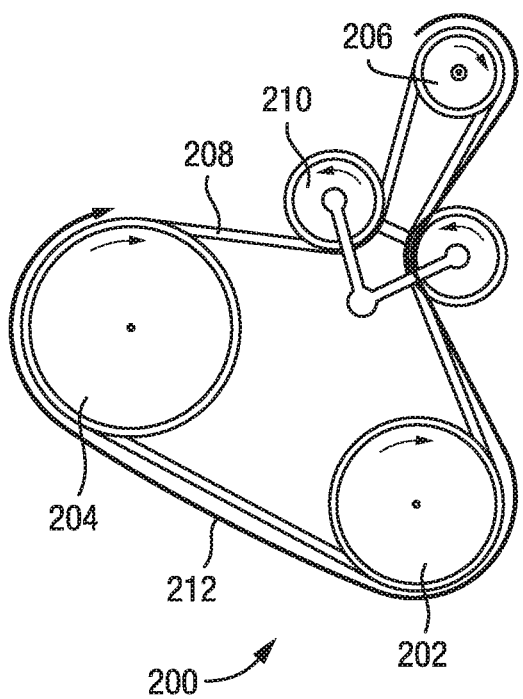
FIG. 5 is a schematic view of a passive, torque loaded front end accessory drive system according to a first arrangement of the present disclosure.

With reference to FIG. 5, a passive front end accessory drive system 200 includes an accessory pulley 202, a drive pulley 204, a generator pulley 206, a drive belt 208, a pair of idler pulleys 210 and torque load 212 transmitted through the drive belt 208.

The torque load 212 is transmitted through the drive belt 208 by virtue of the rotational forces applied to the drive belt 208 by the accessory pulley 202, the drive pulley 204 and the generator pulley 206. If this torque load 212 is allowed to increase excessively, the drive belt 208 can slip, and may become stretched, worn, or damaged.

The torque load is determined, for example, by measuring the torque applied to the drive belt 208 by each of the pulleys in the front end accessory drive system 200 and summing together each of the measured torques. The resulting calculation indicates the torque load transmitted through the drive belt 208.

To improve the ability of the drive belt 208 to transmit torque between the pulleys, the torque being applied by the accessory pulley 202 is modified. By managing the torque applied to the drive belt 208 from the accessory pulley 202, which is attached to, for example, an air conditioning compressor, the functionality of the front end accessory drive system 200 is optimized.

In particular, the modification of the torque applied by the air conditioning compressor via the accessory pulley 202 comprises a reduction in torque to below a predetermined maximum permissible drive belt torque threshold to accommodate a battery charging or recuperation event. The recuperation or recharging event is, for example, a time period during which a motor generator is generating power to supply electrical components of the vehicle, such as the vehicle head lights or windscreen wipers, or when the motor generator is converting kinetic energy into electrical energy to slow the vehicle during deceleration. If the air conditioning compressor is also applying high torque to the belt during recharging or recuperation events, the torque load on the belt could become excessive.

As typical regenerative events can be quite short, the torque applied to the drive belt 208 by the air conditioning compressor, in accordance with an arrangement of the present invention, may be reduced until the recuperation event is over. Alternatively, the reduction in applied torque may be reduced for a predetermined period after which the air conditioning compressor is determined to be too heavily compromised. After the recuperation event has finished, or the predetermined period is over, the air conditioning compressor is returned to operation.

The predetermined permissible drive belt torque threshold defines the maximum torque load that can be transmitted through the drive belt before parasitic losses are introduced to the front end accessory drive system 200. The predetermined permissible drive belt torque threshold may be determined empirically by experiment or theoretically by calculation.

Figure 6:
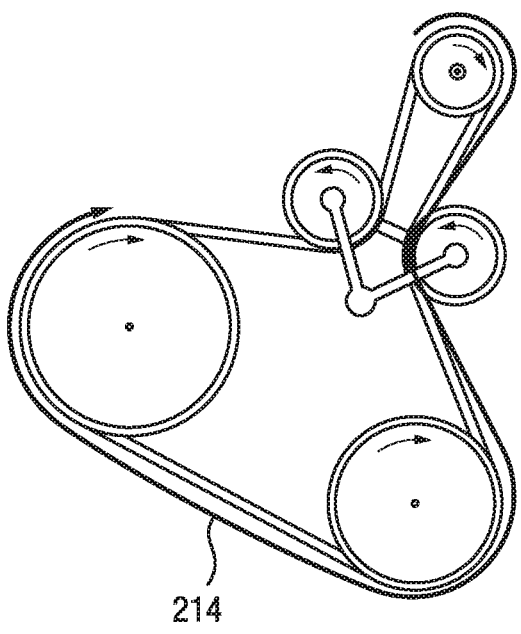
FIG. 6 is a schematic view of a reduced torque loaded passive front end accessory drive system according to the first arrangement of the present disclosure.

FIG. 6 illustrates a reduced torque load 214 that is transmitted through the drive belt 208 as a result of modifying the torque of the air conditioning compressor. The techniques for reducing the torque applied to the drive belt 208 by the air conditioning compressor include the use of a compressor with externally-variable displacement or the use of a compressor with externally variable suction pressure set-point, for example.

Figure 7:
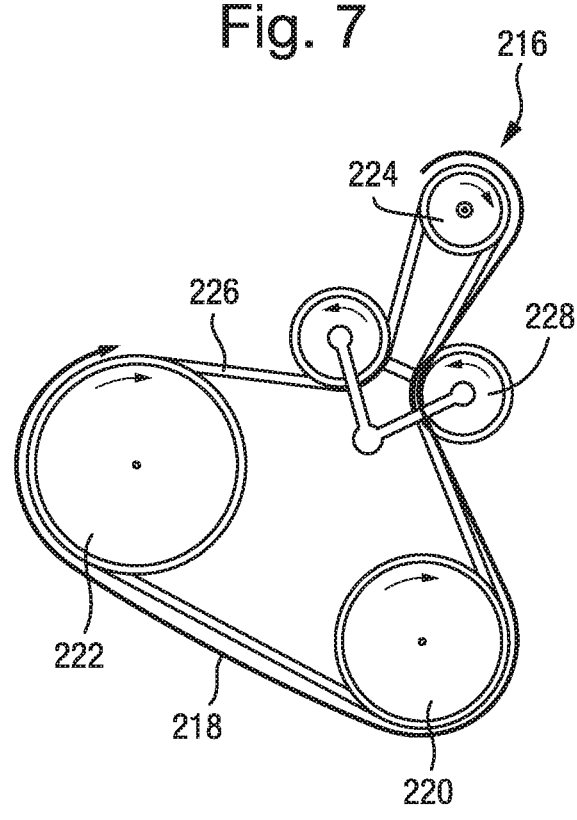
FIG. 7 is another schematic view of a torque loaded passive front end accessory drive system according to the first arrangement of the present disclosure.

With reference to FIG. 7, a front end accessory drive system 216 includes an accessory pulley 220, a drive pulley 222, a generator pulley 224, a drive belt 226, a pair of idler pulleys 228 and a torque load 218 transmitted through the drive belt 226.

Figure 8:
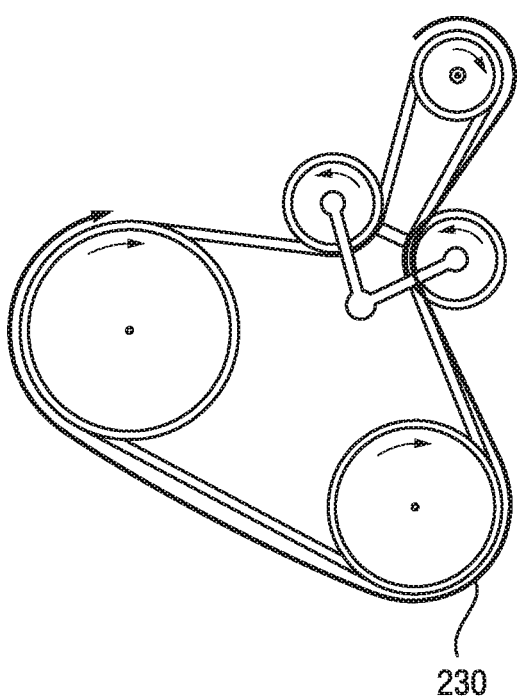
FIG. 8 is another schematic view of a reduced torque load passive front end accessory drive system according to the first arrangement of the present disclosure.

FIGS. 7 and 8 illustrate a case where an engine is rapidly accelerating (e.g. during hard first gear acceleration or at the end of a closed-pedal down-shift for better engine braking). In such a case, the sum total force that is transmitted through the drive belt 226 is increased by the need to accelerate the rotating inertias of the generator pulley 224 and each accessory pulley 220.

In the front end accessory drive system 216 of FIG. 7, the torque load 218 transmitted through the drive belt 226 is managed to accommodate the rapid changes in engine speed. That is, the torque load of the accessory pulley 220 of the air conditioning compressor and/or the torque load of the generator pulley 224 of the motor generator are limited only while the system is being subject to strong engine speed transients. By managing the torque applied to the drive belt 226 by the accessory pulley 220 and/or the generator pulley 224 during engine acceleration, the inertial torque transmitted through the drive belt 226 when the drive belt 226 is forced to change speed is offset, which leads to reduced risk of belt slip. Such an arrangement causes the regenerative torque potential to be reduced or increased during changes in engine speed, while ensuring that the torque available for operating the front end accessory drive system 216 is maximized during changes in engine speed.

In the front end accessory drive system 216 of FIG. 8, the inertial and static torques of the accessory pulley 220 are mitigated by opening a clutch (e.g. an electromagnetic air conditioning compressor clutch) thereby disconnecting the air conditioning compressor from the accessory pulley 220. As a consequence of the air conditioning compressor being disconnected from the front end accessory drive system 216, a reduced torque load 230 is transmitted through the drive belt 226 thereby reducing the parasitic losses of the front end accessory drive system 216.

Inertial torques are further managed by active control of the motor generator and the air conditioning compressor. By actively controlling the torque applied to the drive belt 226, it is possible to temporarily reduce the regenerative drag torque of the generator pulley 224, during a regenerative event, and the inertial torque applied by the accessory pulley 220, during use of the air conditioning compressor, thereby ensuring the torque load 218 transmitted through the drive belt 226 is maintained within the limits of the maximum permissible drive belt torque threshold.

The technique by which the motor generator and the air conditioning compressor are controlled involves taking real time measurements of the torque applied to the drive belt 226 by the pulleys and increasing or decreasing the torque demand of the motor generator and/or the air conditioning compressor to ensure the total torque transmitted through the drive belt 226 does not exceed the maximum permissible drive belt torque threshold.

A further drive belt 226 torque management technique involves utilizing the energy supplied from the motor generator to compensate for inertial torques applied to the drive belt 226 by, for example, the air conditioning compressor. Such a technique provides a means for the air conditioning compressor to draw the required torque from the drive belt 226, by adding energy to the front end accessory drive system 216 from the motor generator. In this technique, the inertial torques applied to the front end accessory drive system 216 are compensated by the motor generator, via the generator pulley 224, leaving the drive belt 226 to only cope with the static torque load applied by the air conditioning compressor, vie the accessory pulley 220.

Figure 9:
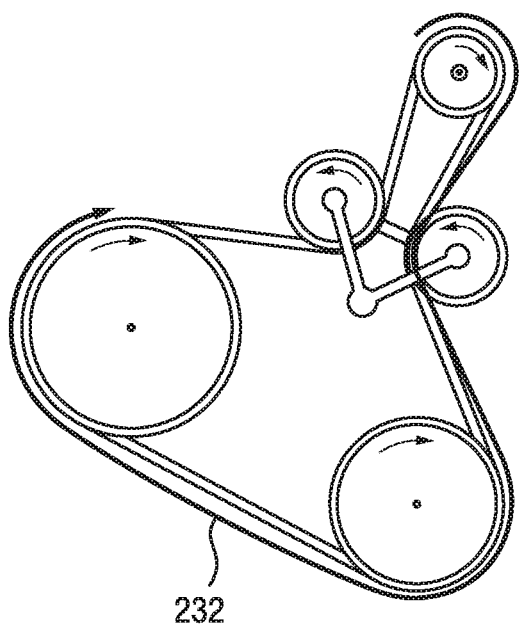
FIG. 9 is a schematic view of a torque loaded passive front end accessory drive system according to a second arrangement of the present disclosure.
Figure 10:
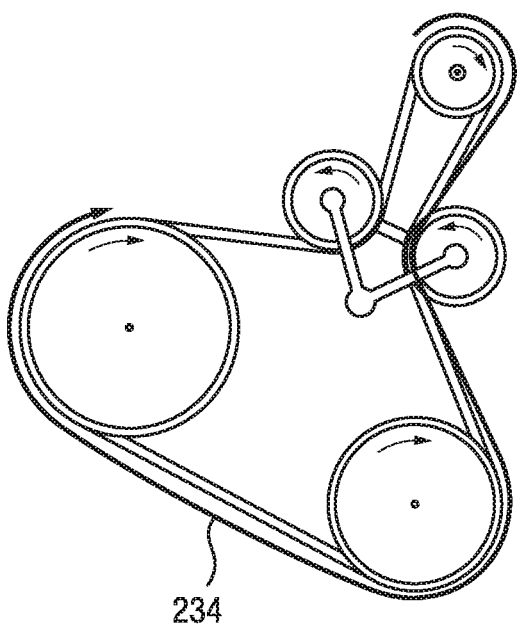
FIG. 10 is a schematic view of a reduced torque load passive front end accessory drive system according to the second arrangement of the present disclosure.

FIGS. 9 and 10 illustrate the case where the inertial torque applied to the drive belt 226 by the accessory pulley 220 is offset by energy added to the front end accessory drive system 216 by the generator pulley 224. In particular, the torque load 234 of FIG. 10 is significantly reduced compared to the torque load 232 of FIG. 9.

A further technique by which the service life of the drive belt 226 of the front end accessory drive system 216 is extended includes monitoring the condition of the drive belt 226 over the life of the front end accessory drive system 216 and actively managing the maximum permissible drive belt torque threshold accordingly. In such a technique, the maximum permissible drive belt torque threshold would be reduced over the life of the front end accessory drive system 216 to reflect the expected degradation of the belt. Drive belt degradation is determined based on drive belt performance characteristics, which include, for example, drive belt slip, drive belt stretch, friction characteristics, drive belt cracking, drive belt pilling, drive belt abrasion, drive belt age and drive belt rib separation.

The maximum permissible drive belt torque threshold is determined by measuring each of the one or more drive belt performance characteristics at a predefined frequency over the life of the front end accessory drive system 216. The measured drive belt performance characteristics are subsequently used to calculate a drive belt condition value. The drive belt condition value is compared to a database of drive belt condition values vs drive belt adjustment values, and the amount by which the maximum permissible drive belt torque threshold should be adjusted is selected as the drive belt adjustment value closest to the calculated drive belt condition value.

The technique of actively managing the maximum permissible drive belt torque threshold can be used in combination with any of the techniques discussed above in relation to managing the torque load applied to the drive belt 226. By combining these techniques, the level of intervention required (for example, disconnecting the accessory compressor by releasing a clutch) would increase during the life of the vehicle as the drive belt 226 degrades through normal aging.

In all of the techniques described above, the control of the accessory component torque (i.e. the air conditioning compressor) or the motor generator torque could be implemented by an electronic control module in a motor vehicle, for example a powertrain control module (PCM). The PCM estimates the torque applied to the drive belt at each pulley and calculates a maximum permissible drive belt torque load. The torque demand of the components connected to the front end accessory drive system is adjusted accordingly to avoid drive belt slip at any of the pulleys on the drive belt. In a specific embodiment, only one or more selected driven components would be subject to torque limitation. For example, in a typical front end accessory drive system, the drive pulley might always be prioritized so that the total required torque at the drive pulley is always allowed for, while the calculated limitation is applied to other components.

The predetermined limiting pulley, and the corresponding component, is determined based on, for example, criticality of operation of the remaining components, or balance between hybrid operation, generating using the motor generator, air conditioning compressor operation and power assisted steering operation. Furthermore, torque loads that are applied to the front end accessory drive system from accessory pulleys of components that cannot be controlled or are important for operation of the vehicle (for example, hydraulic power assisted steering or a water pump) should be taken into account when limiting the torque applied by other components which can be controlled.

Although the above embodiments are described in relation to a passive front end accessory drive system, they may also be applied to an active front end accessory drive system to extend the range of operation of a passive state, or to reduce the maximum drive belt tension required in an active state.

It will be appreciated by those skilled in the art that although the claimed subject matter has been described by way of example, with reference to one or more representative embodiments, it is not limited to the disclosed examples and that alternative examples could be constructed without departing from the scope of the claimed subject matter.

What is claimed is:

1. A method of operating a hybrid vehicle accessory drive system including a flexible drive element configured to transmit torque between an accessory, a motor/generator, and an engine, comprising:
controlling, by a vehicle controller, the accessory to reduce accessory torque demand responsive to a recuperation event with the motor/generator operating as a generator such that the torque between the accessory, the motor/generator, and the engine is less than a torque threshold for the flexible drive element.

2. The method of claim 1 further comprising adjusting the torque threshold for the flexible drive element based on age of the flexible drive element.

3. The method of claim 1 further comprising adjusting the torque threshold for the flexible drive element in response to the vehicle controller detecting slipping of the flexible drive element.

4. The method of claim 1 wherein controlling the accessory to reduce accessory torque demand is performed for a predetermined period of time.

5. The method of claim 1 wherein controlling the accessory to reduce accessory torque demand is performed for a duration of the recuperation event.

6. The method of claim 1 wherein the accessory is an air conditioning compressor and wherein controlling the accessory comprises disengaging a clutch associated with the air conditioning compressor.

7. The method of claim 1 further comprising controlling torque demand of the motor/generator responsive to the recuperation event to limit the torque between the accessory, the motor/generator, and the engine to less than the torque threshold for the flexible drive element.

8. The method of claim 1 wherein controlling the accessory to reduce the accessory torque demand comprises reducing the accessory torque demand to offset an increase in torque demand of the motor/generator.

9. The method of claim 1 wherein controlling the accessory to reduce the accessory torque demand comprises modulating or disconnecting a clutch between the accessory and a pulley of the accessory.

10. The method of claim 1 further comprising increasing tension of the flexible drive element to increase the torque threshold for the flexible drive element.

11. The method of claim 10 wherein the tension of the flexible drive element is increased by adjusting position of a pulley which engages the flexible drive element.

12. The method of claim 1 further comprising controlling position of a pulley which engages the flexible drive element to increase a wrap angle of the flexible drive element around at least one pulley associated with the accessory, the engine, or the motor/generator to increase the torque threshold for the flexible drive element.

\* \* \* \* \*